Figure 1:
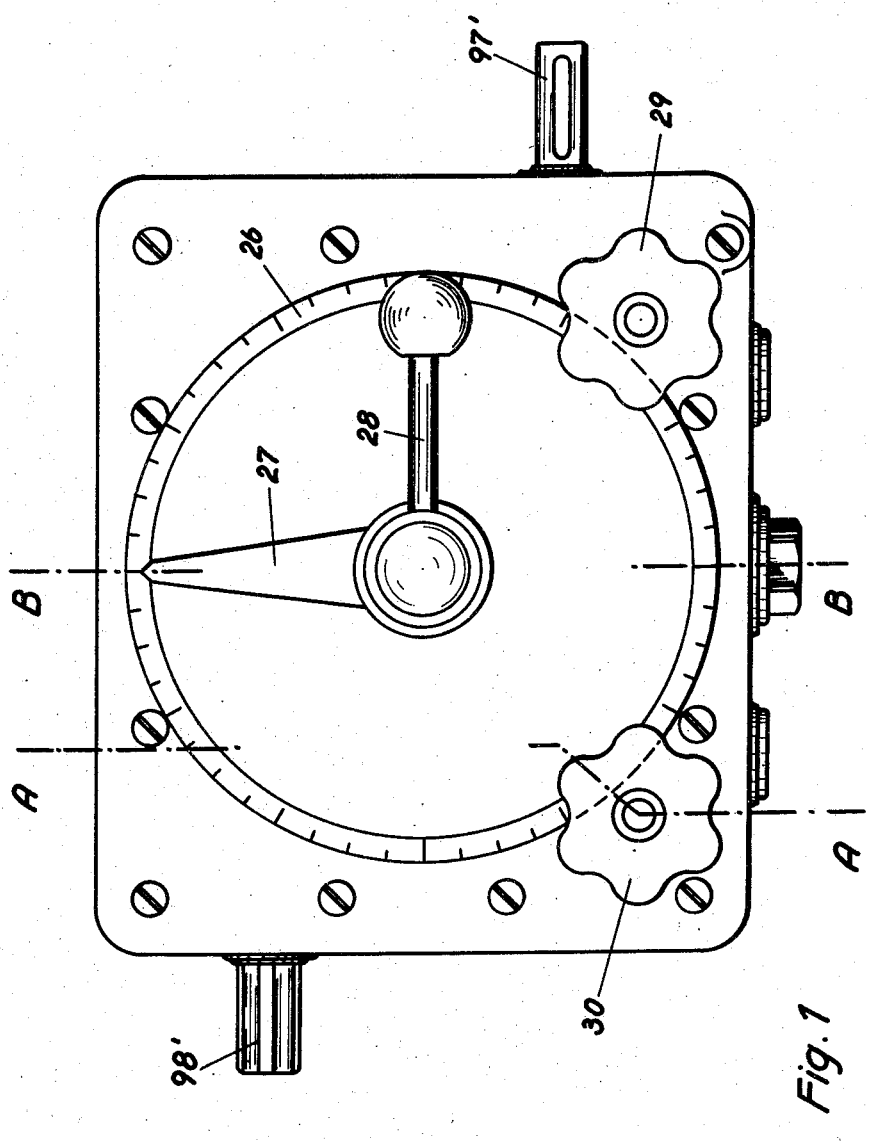

Inventor:
Adolf Ortlinghaus
By:
Michael S. Striker
agt.

June 14, 1955  A. ORTLINGHAUS  2,710,545
OPERATING ARRANGEMENT FOR GEAR TRANSMISSIONS
Filed May 12, 1952  12 Sheets-Sheet 7

Inventor:
Adolf Ortlinghaus
By:
Michael S. Striker

June 14, 1955     A. ORTLINGHAUS     2,710,545
OPERATING ARRANGEMENT FOR GEAR TRANSMISSIONS
Filed May 12, 1952     12 Sheets-Sheet 8

Inventor:
Adolf Ortlinghaus
By:
Michael S. Striker
agt.

June 14, 1955    A. ORTLINGHAUS    2,710,545
OPERATING ARRANGEMENT FOR GEAR TRANSMISSIONS
Filed May 12, 1952    12 Sheets-Sheet 9

Inventor:
Adolf Ortlinghaus
By:
Michael S. Striker
agt.

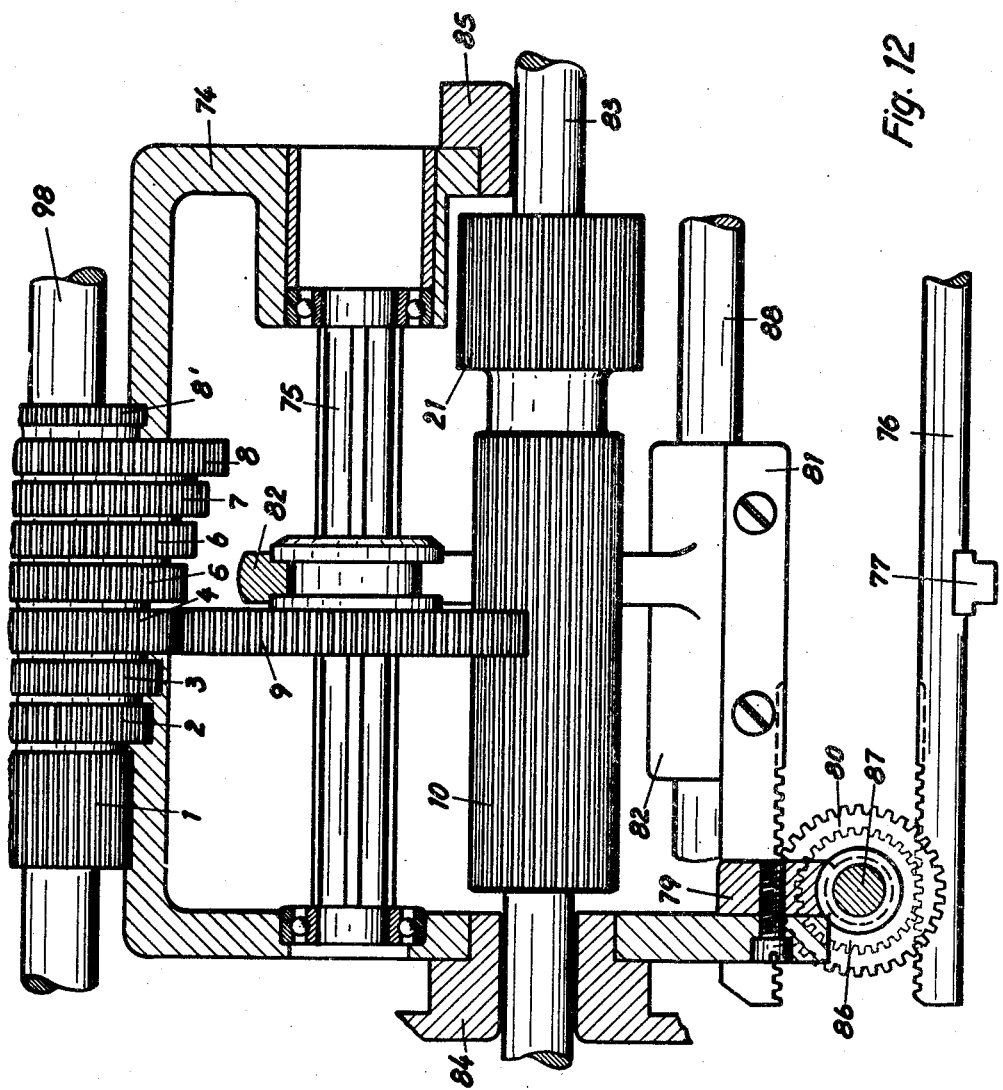

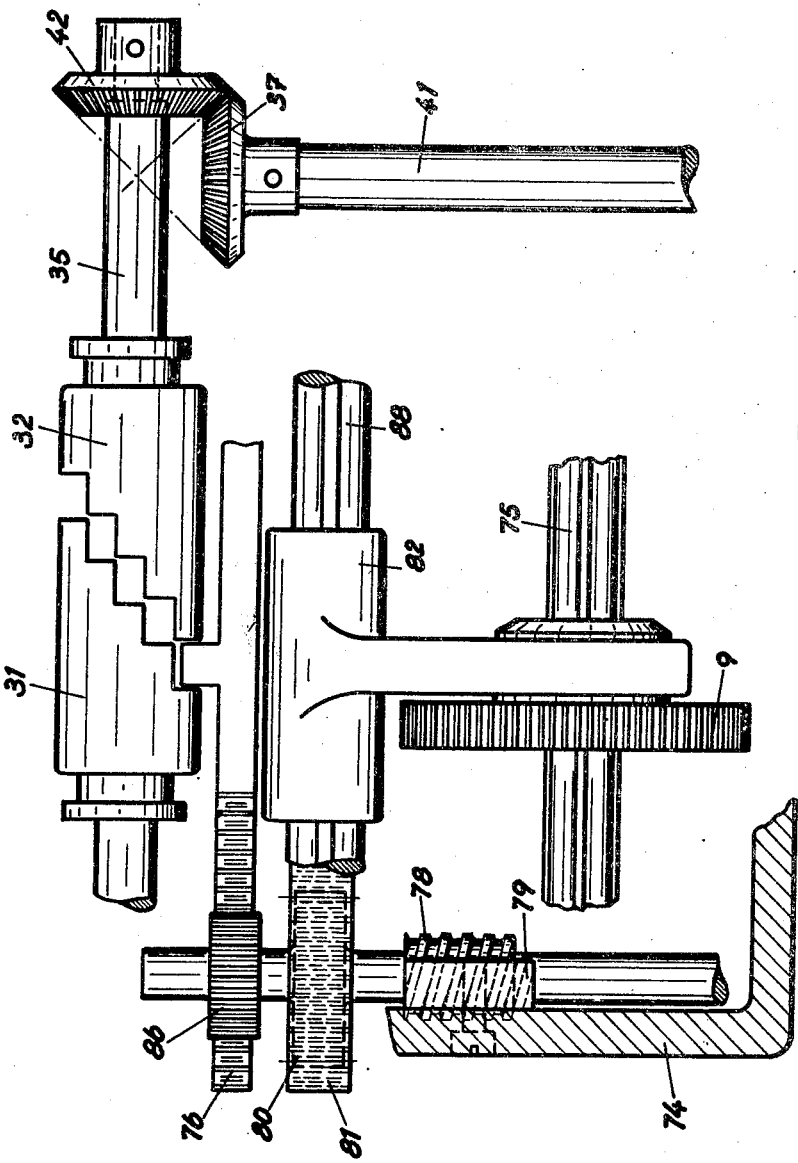

United States Patent Office 2,710,545
Patented June 14, 1955

2,710,545

OPERATING ARRANGEMENT FOR GEAR TRANSMISSIONS

Adolf Ortlinghaus, Remscheid, Germany

Application May 12, 1952, Serial No. 287,394

15 Claims. (Cl. 74—341)

The present invention relates to a transmission arrangement, and more particularly to an operating arrangement for a Norton type transmission.

It is known to use Norton type transmissions for cutting threads on lathes. The known arrangements have the disadvantage that the operating handle of the Norton arm passes to the outside through an opening in the housing permitting entering of dirt and metal shavings and making it impossible to fill the housing with lubricating oil. The known transmissions of this type, employing completely closed housings, have the disadvantage that they have to be operated by a multitude of levers and do not permit a direct reading of the indicating means showing the transmission ratio and the speed of feed.

It is the object of the present invention to provide a transmission arrangement which is completely enclosed in a housing.

It is another object of this invention to provide a transmission arrangement provided with a pre-selecting device operated by one knob and a shifting device operated by a single lever.

It is a further object of the present invention to provide in a transmission arrangement indicating means indicating the pre-selected ratio of transmission.

It is a still further object of the present invention to provide a transmission arrangement in which the positions of a Norton type transmission and of at least one further shiftable transmission are in accordance with indicating means showing the transmission ratio, and to provide manually operated means shifting the Norton type transmission and simultaneously shifting said further transmission so as to further vary the speed of the driven shaft.

It is also an object of the present invention to provide in a transmission arrangement indicating means including a movable pointer and a movable dial, wherein the pointer indicates a pre-selected position of a Norton type transmission, while the dial is intermittently rotated to indicate the pre-selected position of additional shiftable transmissions provided for varying the transmission ratio obtained by the Norton type transmission.

With these objects in view the present invention mainly consists in an operating arrangement for a Norton transmission including a set of coaxial stepped gears, a pivoted arm and connecting gear means rotatably and longitudinally slidably mounted on the arm. Such operating arrangement comprises a housing including supporting means, a first actuating member mounted in the supporting means slidable parallel to the axis of the stepped gears and engaging the connecting gear means for sliding the same, a second actuating member turnably mounted on the supporting means and engaging the pivoted arm for pivoting the same, operating means rotatably mounted on the supporting means movable to a number of angularly spaced operative positions equal to the number of the stepped gears, and engaging the first actuating member and the second actuating member and during rotation thereof sliding the first actuating member and turning the second actuating member between a number of operative positions for effecting engagement of the connecting gear means with one of the stepped gears, actuating means mounted on the supporting means movable to a number of operative positions equal to the number of the stepped gears, the actuating means turning the operating means into the operative positions of the same, shaft means rotatably mounted in the supporting means, shifting means mounted on the shaft means non-rotatably and longitudinally slidable between an inoperative position and an operative position, first manually operated means rotating the shaft means and thereby the shifting means to a number of angular positions equal to the number of the stepped gears while the shifting means are in the inoperative position, a plurality of stepped projection means on the shifting means, the number of the projection means corresponding to the number of the stepped gears, one of the projection means being located oppositely the actuating means in each of the angular positions of the shaft means and the shifting means, and second manually operated means longitudinally sliding the shifting means on the shaft means and effecting engagement of one of the projection means with the actuating means in operative position of the shifting means and movement of the actuating means to one of the operative positions thereof for a distance corresponding to the extension of the projection means engaging the actuating means.

Preferably two further transmissions cooperate with the Norton type transmission for varying the speed of the driven shaft for cutting inch threads, millimeter threads and other types of threads. In this preferred embodiment additional actuating and shifting means are provided, which are operated by second manually operated means simultaneously with the first shifting means.

Indicating means are provided which are driven by the first manually operated means and indicate the pre-selected position of the Norton transmission and of any additional transmissions which may be provided for further varying the transmission ratio.

Figure 2:
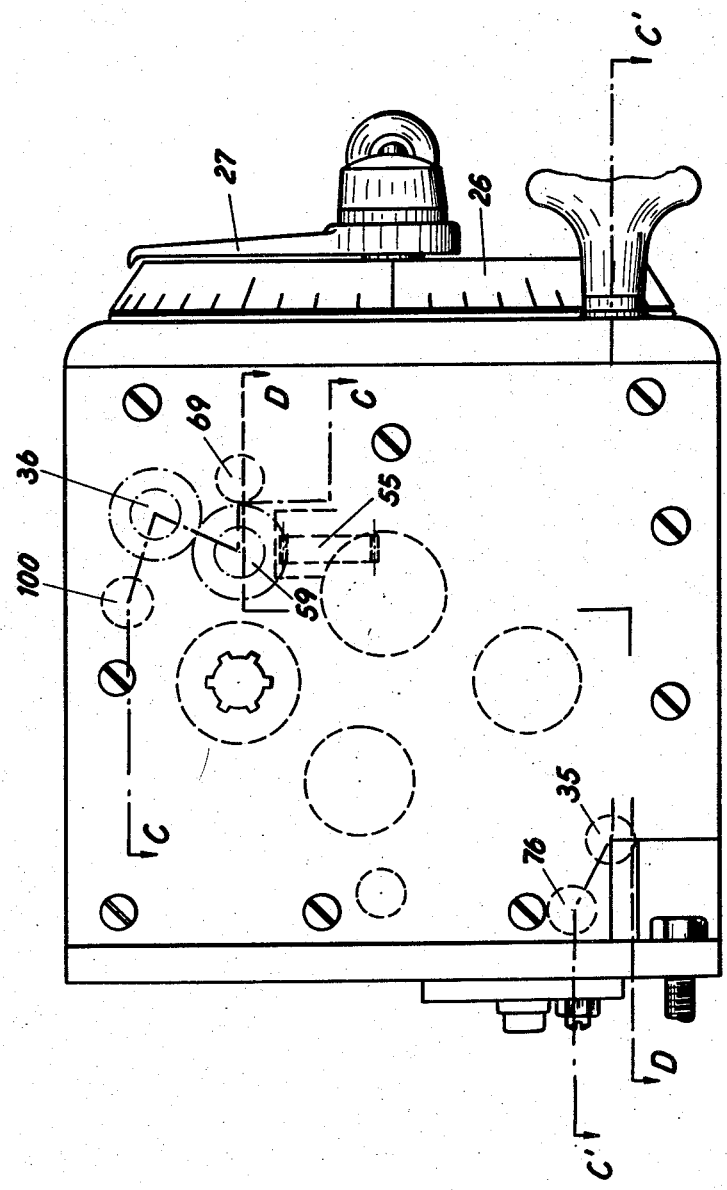
Figure 3:
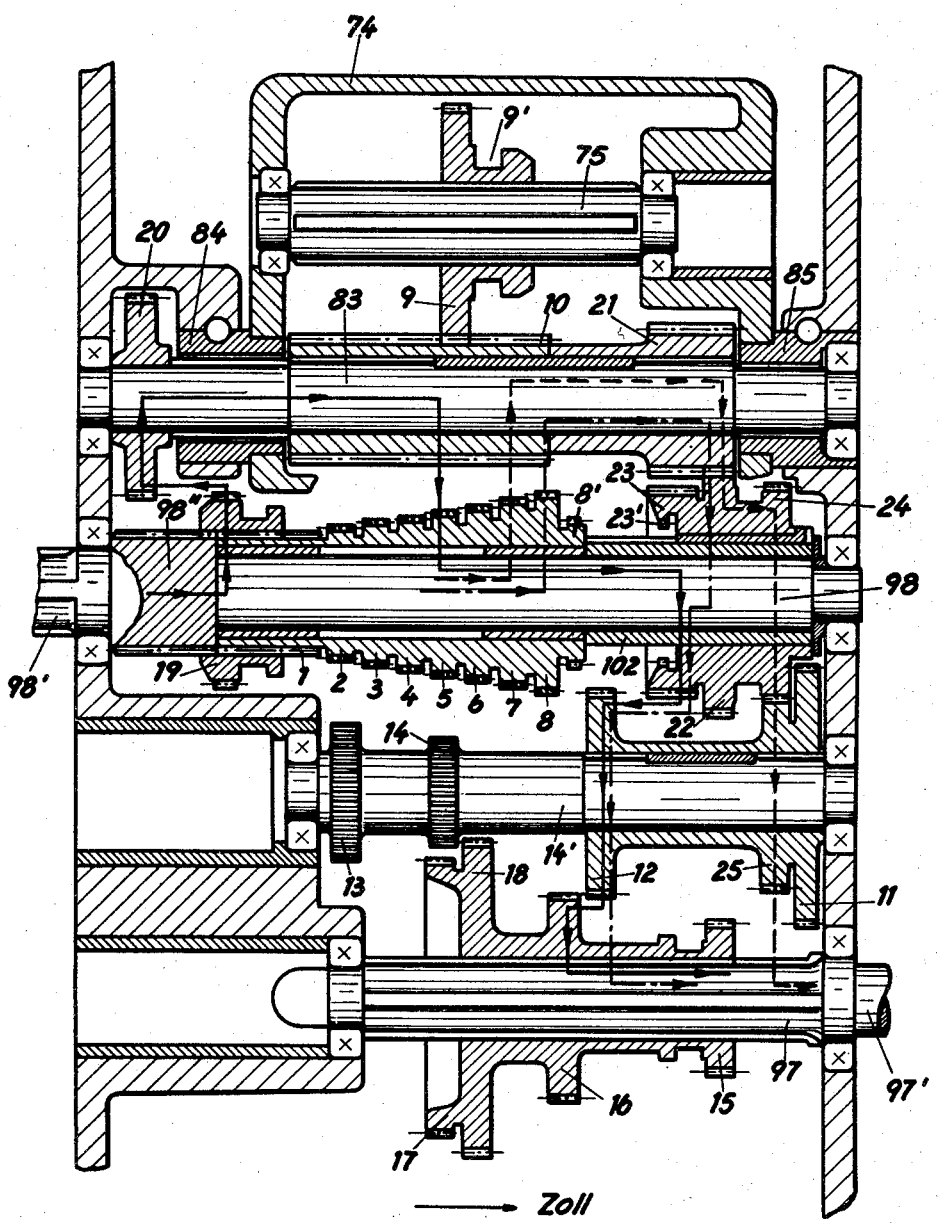
Figure 4:
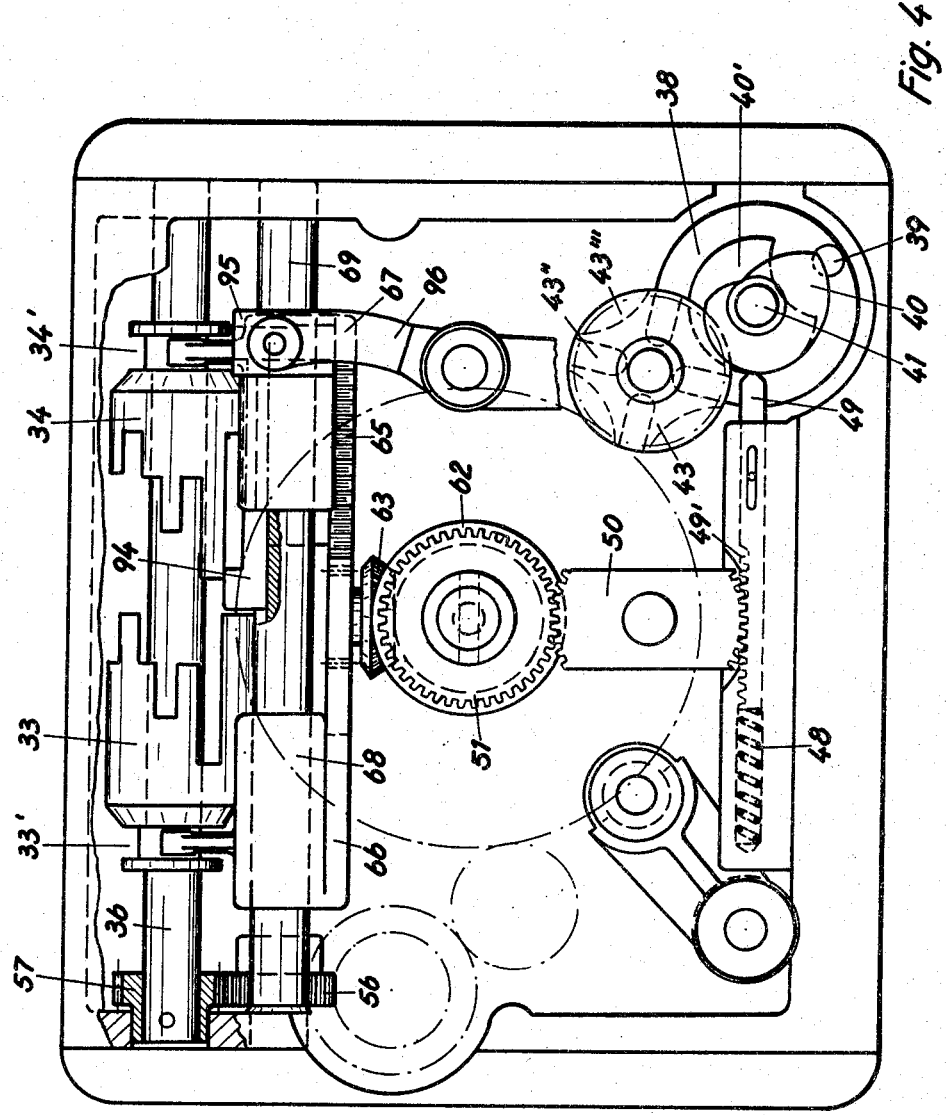
Figure 5:
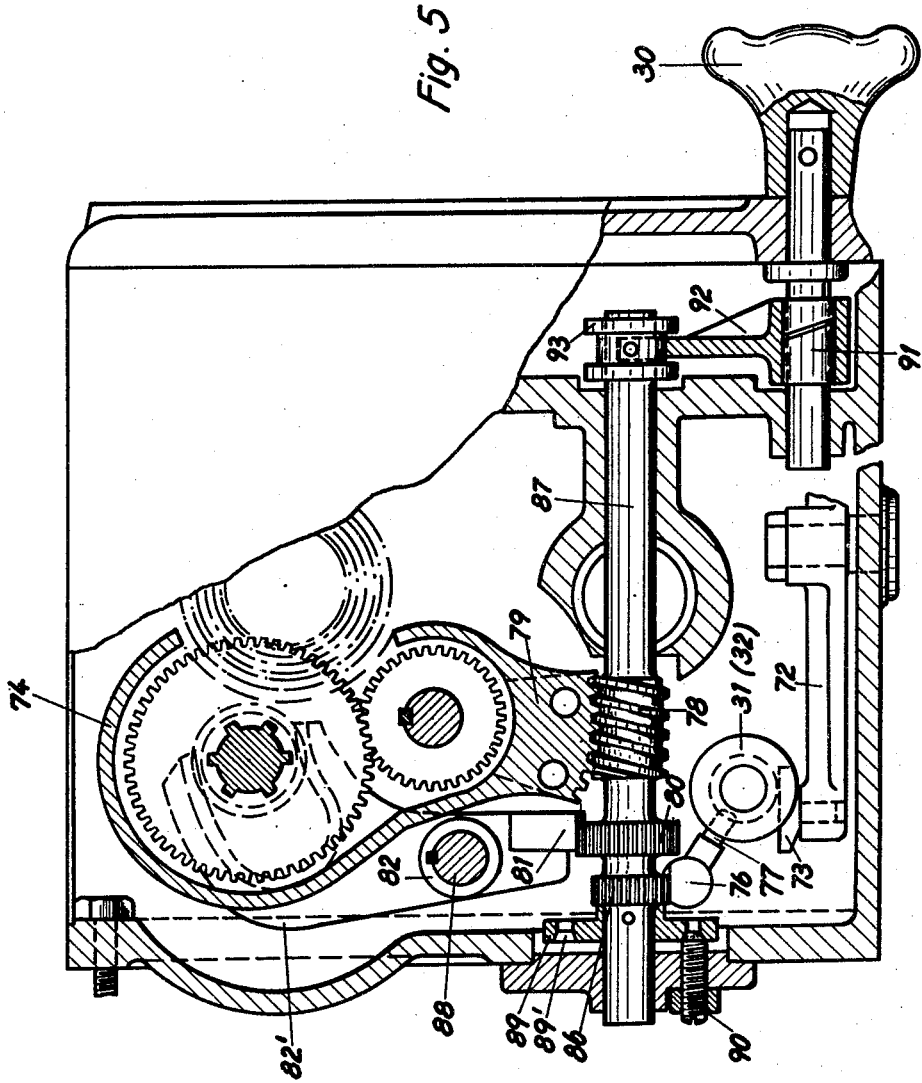
Figure 6:
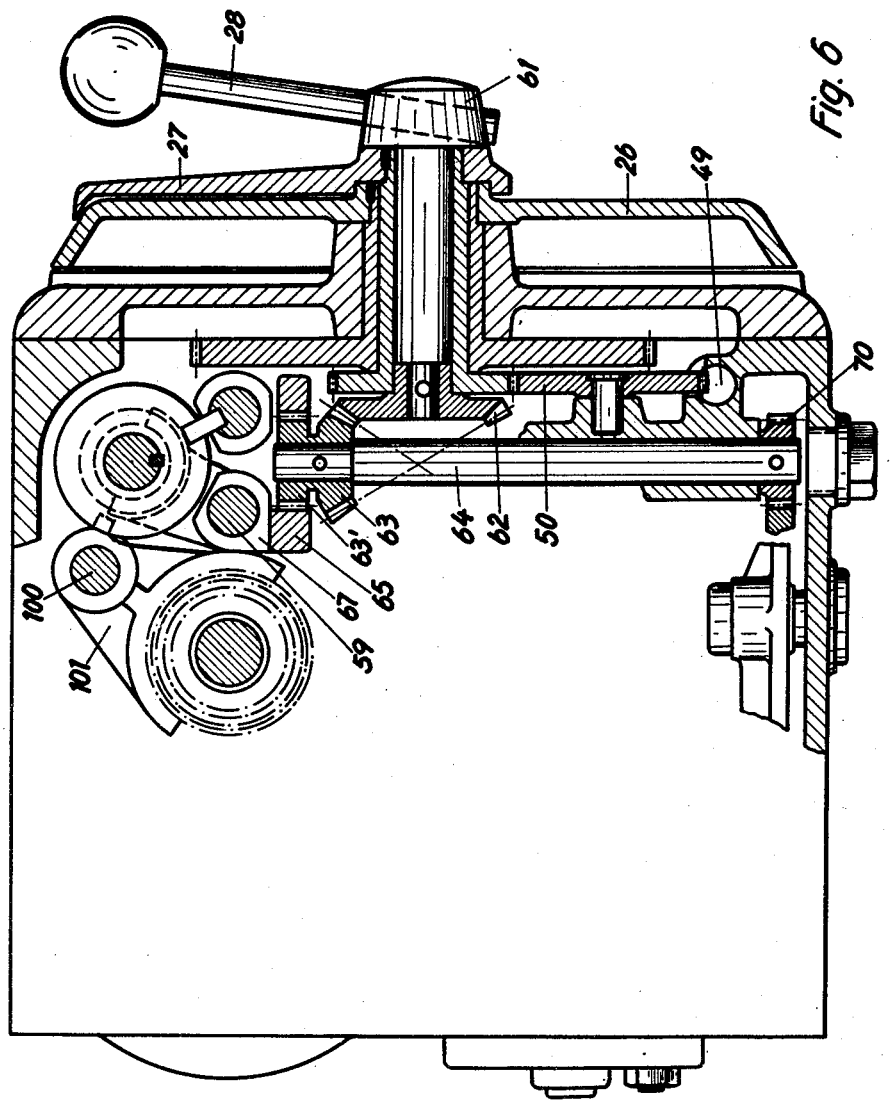
Figure 7:
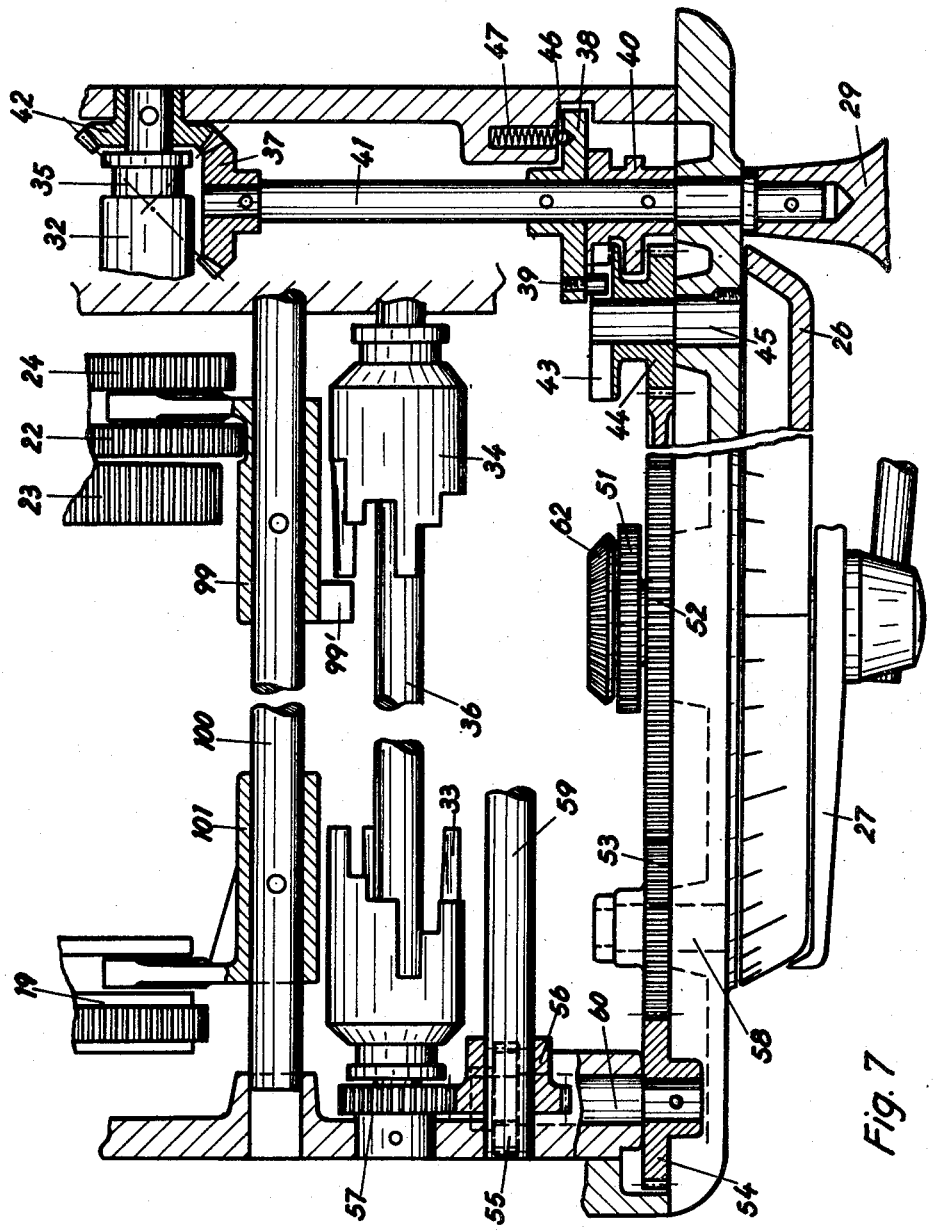
Figure 8:
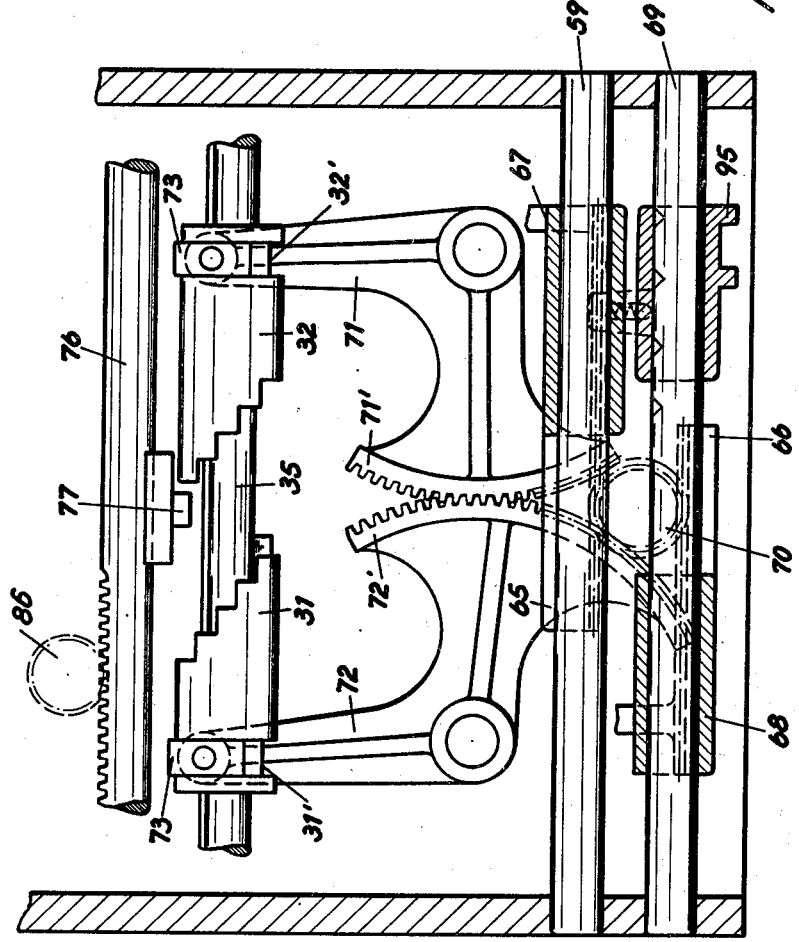
Figure 9:
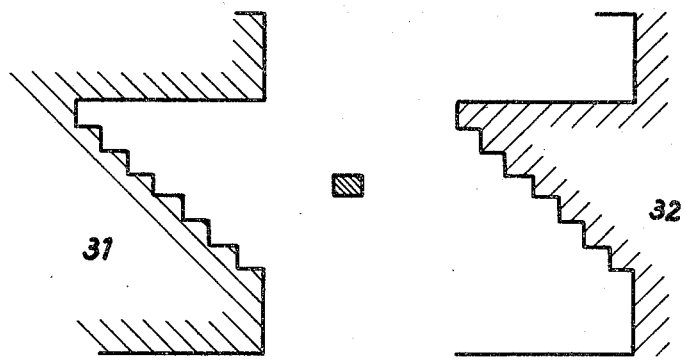
Figure 10:
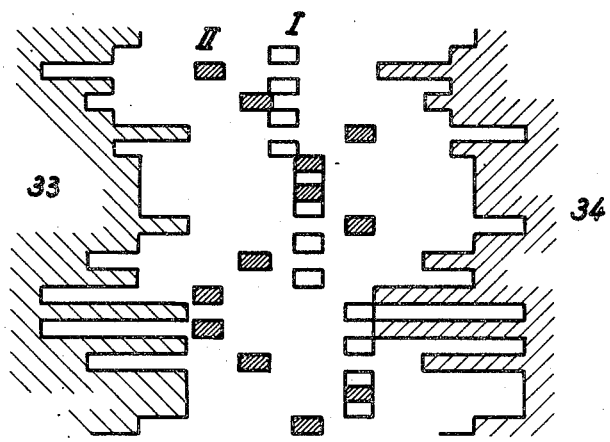
Figure 11:
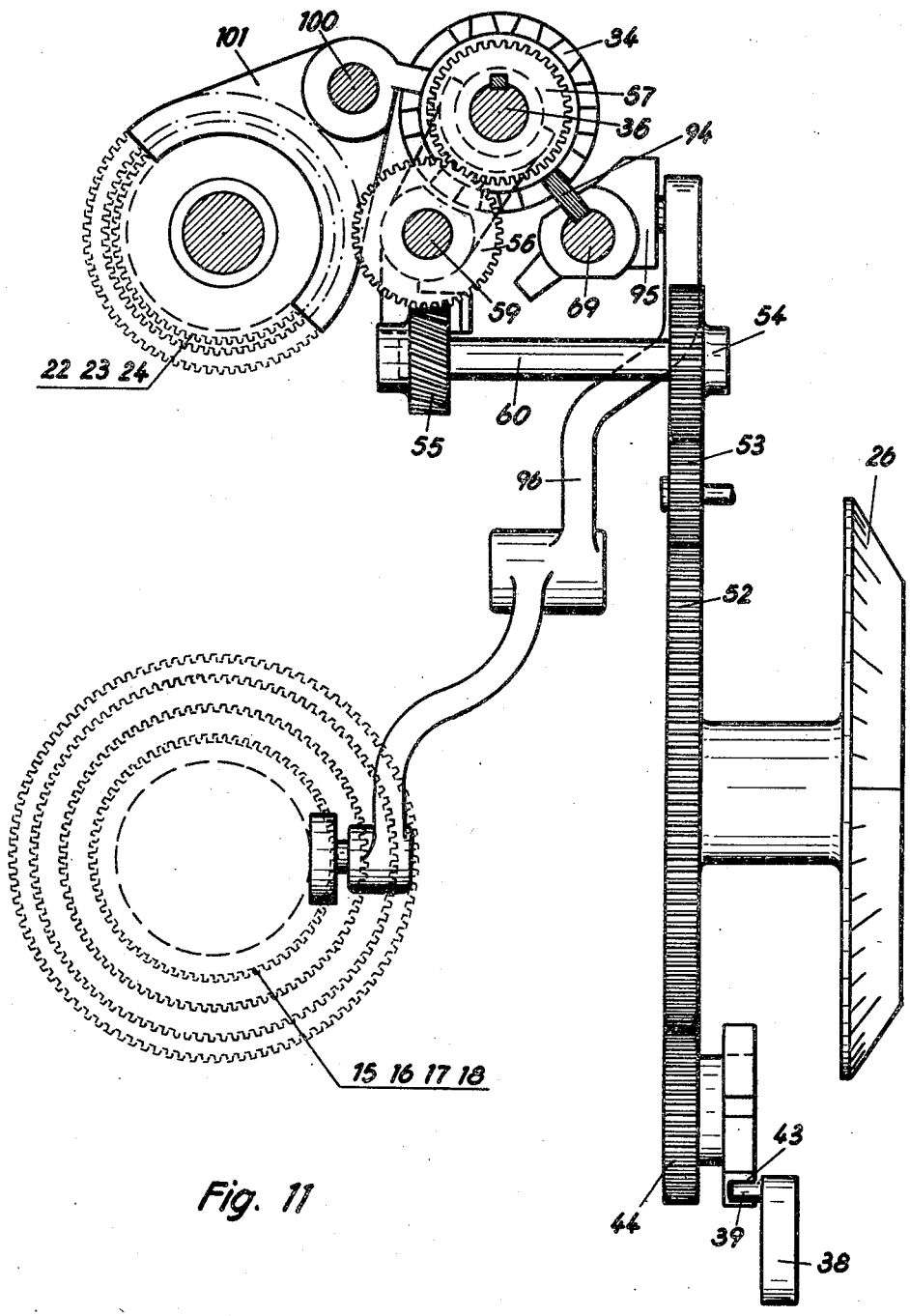

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Fig. 1 is a front view of the transmission housing;
Fig. 2 is a side view of the transmission housing;
Fig. 3 is a development of a longitudinal section of a transmission arrangement according to the present invention;
Fig. 4 is a front view of the transmission arrangement with the front wall of the housing removed;
Fig. 5 is a cross-sectional view on line A—A of Fig. 1;
Fig. 6 is a vertical sectional view on line B—B in Fig. 1;
Fig. 7 is a sectional view on lines C—C and C'—C' in Fig. 2, a portion of the view being shifted for the sake of clarity;
Fig. 8 is a horizontal sectional view on line D—D of Fig. 2;
Figs. 9 and 10 show developments of the operating faces of the shifting members;
Fig. 11 is a side view of a detail of the transmission arrangement;
Fig. 12 is a sectional view showing the Norton transmission; and
Fig. 13 is a horizontal sectional view similar to Fig. 7.

Referring now to the drawings, the development of the transmission arrangement illustrated in Fig. 3 shows an arrangement permitting cutting of 96 different threads, namely, 32 different inch threads, 32 millimeter threads and 32 module threads. A Norton type transmission is provided having 8 stepped gears 1 to 8 and cooperating with the connecting gear 9 which is longitudinally slidably but non-rotatably mounted on the shaft 75 (Fig. 12). Shaft 75 is rotatably mounted on the arm 74 which is pivotable about the hollow shafts 84 and 85. By sliding the connecting gear 9 parallel to the axis of the stepped gears 1 to 8 on shaft 75 while the arm 74 is pivoted to a position spaced from the stepped gears 1 to 8, the transmission ratio is pre-selected, whereupon the arm is pivoted, about an angle corresponding to the diameter of the respective gear 1–8, to the position in which the connecting gear 9 engages one of the stepped gears 1 to 8. The operating means for pivoting arm 74 and shifting the connecting gear 9 will be described in greater detail hereinafter.

In addition to the Norton transmission another transmission is provided for increasing the ratio of the transmission and comprising the gears 11 to 18, and a further transmission for adapting the transmission arrangement to the cutting of inch threads, millimeter threads, and module threads, such transmission comprising the gears 19 to 25.

In the event that the lathe is provided with a screw spindle having an inch thread, and an inch thread is to be cut, the force is transmitted along the solid line A in Fig. 3 in the direction of the arrows from the drive shaft 98′ to the driven shaft 97′. The broken line B indicates the transmission of force when millimeter threads are cut, and the dotted line C indicates the transmission of force when, for instance, module thread is cut.

The stepped gears are freely rotatably mounted on the drive shaft 98. The gear unit 22, 23, and 24 is axially slidably, but non-rotatably mounted on the sleeve 102 which is freely rotatable on the drive shaft 98. A gear 98″ is provided on the left end of the drive shaft 98 corresponding exactly to the gear 1.

The gear 19 is fixedly connected to the gear unit 22, 23 and 24 and moves in axial direction together with the same. Such axial shifting is carried out by means which will be described in greater detail hereinafter. Gear 19 is provided with internal teeth and slides on the gears 98″ and 1 so that in the position shown in Fig. 3 the gear 19 couples the stepped gears 1 to 8 to the drive shaft 98. Gear 19 is movable to the left, first to an intermediate position still coupling the shaft 98 with the stepped gears 1 to 8, and further to a position meshing with gear 20, in which position the drive shaft 98 is disengaged from the stepped gears 1 to 8.

If the gears 19 and 20 are meshing the drive shaft 98 rotates the shaft 83, the connecting gear means 9 and 10, the stepped gears 1 to 8, the gear 8′ which meshes with the inner gear 23′ when the gear unit 22–24 is shifted to the left, the gear 23, gear 102 and gear 16. The shiftable transmission unit 15, 16, 17 and 18 is axially slidably but non-rotatably mounted on the driven shaft 97 and cooperates with the transmission unit 11, 12, 13 and 14 so that the gears 11 and 15, 12 and 16, 13 and 17, or 14 and 18, respectively, mesh, the shiftable transmission unit being shifted by means which will be described in greater detail hereinafter. The gears 24 and 25, the gears 23 and 12 also mesh in respective shifted positions of the shiftable transmission unit 19, 22–24. In the intermediate position of the gear 19 and the gear block 22–24, in which module thread is cut, the gears 19 and 20 and the gears 8′ and 23′ are disengaged and the gears 21 and 22, and the gears 12 and 23 mesh.

The gear 1 and the drive shaft 98 are coupled in the illustrated position of gear 19 for cutting millimeter thread while the gears 12 and 23 are disconnected and the gears 24 and 25 mesh.

The free portion 97′ of the driven shaft may be coupled to the slotted shaft of the lathe and provided with shiftable gear means which may be shifted into engagement with a gear on the screw spindle of the lathe so that all speeds of the transmission may be transmitted only to the slotted shaft, or, during thread cutting, also to the screw spindle. The portion 98′ on the drive shaft 98 may also carry change gears which are driven in known manner from the main spindle of the lathe through a reversing gear and a variable transmission adaptable to normal gears and gears having a special pitch.

An operating arrangement according to the present invention permits pre-selection of the position of the connecting gear 9 and of the positions of the shiftable transmission units 19, 22, 23, 24 and 15, 16, 17, 18 by turning a single knob, while the selected transmission ratio is indicated on indicating means. Thereupon the connecting gear 9 is shifted, the arm 74 pivoted, and the transmission unit 19, 22, 23, 24 and the transmission unit 15, 16, 17, 18 simultaneously shifted to the pre-selected positions by manually turning a handle.

Referring now to Fig. 1, a dial 26 over which a pointer 27 moves is rotatably mounted in the housing 200. The handle 28 serves for shifting the gears, while the knob 29 is provided for pre-selecting the gear ratio. A knob 30 operates a locking means for the gears which lock the transmission arrangement in any operating position in which gears are engaging each other. During pre-selection and shifting the locking means are disengaged by turning the knob 30.

According to a preferred embodiment of the present invention all threads and speeds of feed are indicated on the dial 26 arranged in three groups of 32 steps each, each group being divided into four sub-groups having eight steps and corresponding to the eight stepped gears of the Norton transmission. Before the pre-selection is carried out by the knob 29, the handle 28 must be turned to the left so that the gears are disengaged.

The arrangement is such that by turning of the knob 29 in both directions for three quarters of a revolution the pointer 27 is moved within one of the sub-groups, one of the eight stepped gears being pre-selected. In each position of the pointer, corresponding to one of the eight operative positions of the connecting gear 9 opposite one of the stepped gears 1 to 8, a catch 46 operates so that such position can be felt by the operator. Further rotation of the knob 29 for the last quarter of a revolution effects return of the pointer 27 to its original position and shifting of the dial for one twelfth of a revolution whereupon the movement of the pointer is repeated in the next sub-group of the dial when the knob 29 is turned.

Referring now to Figs. 4 and 7 the first manually operated means for pre-selecting the transmission ratio comprise a shaft 41 which is rotated by the knob 29. Fixed on the shaft 41 is a cam 40 and a driving disc 30 of a Maltese transmission provided with a pin 39. The disc 40′ which can be best seen in Fig. 4 holds the Maltese cross 43 immovably during three quarters of a revolution of the shaft 41 by engaging the recess 43‴. When, however, the pin 39 passes into a recess 43″ of the Maltese cross, the Maltese cross 43 is shifted and rotates on the shaft 45 which is fixedly secured to the supporting means of the transmission. The Maltese cross 43 is integral with a gear 44 which meshes with the large gear 52 which is secured to the dial 26 as can be best seen from Fig. 6. Consequently, the gears 44 and 52 rotate intermittently causing an intermittent rotation of the dial 26 during each revolution of shaft 41.

The cam 40 rotates with the knob 29 and the shaft 41 and is engaged by an elongated cam follower means 49 which is longitudinally slidably but non-rotatably mounted in the supporting means of the transmission and is urged by a spring means 48 into engagement with the cam 40, a pin 201 sliding in the slot 201′ preventing rotation of the cam follower means. The cam follower means 49 are provided with a toothed rack portion 29′ meshing with a toothed segment 50 which is rockably mounted in the supporting means.

As can be best seen from Fig. 6, the toothed segment meshes with a gear 51 which is fixedly secured to the pointer 27 for rotation therewith. The shape of the cam 40 is such that during each rotation of the knob 29 and the shaft 41 the pointer 27 passes over the eight steps of a sub-group on the dial and is then returned by the spring 48, which acts through the cam follower 49, rack portion 49', toothed segment 50, gear 51. This return movement of the pointer 27 to its original position is carried out simultaneously with the shifting of the dial 26 so that when the first manually operated means are operated by turning the knob 29 for a further revolution, the pointer 27 is at the beginning of a new sub-group of the dial 26 and passes over the eight steps of such sub-group when the knob 29 is turned for one revolution.

The ratio between the gears 44 and 52 is 1:3 so that with each revolution of the knob 29 the dial is turned intermittently for one twelfth of a revolution.

On the end of shaft 41 a bevel gear 37 is fixedly secured, meshing with a bevel gear 42 which is fixedly secured to a shaft 35, as can be best seen from Fig. 7. As can be best seen from Fig. 8, the shaft 35 carries two first shifting means 31 and 32 which are axially slidably but non-rotatably mounted on shaft 35, and serve for shifting the Norton transmission. Second shifting means 33, 34 (Figs. 4 and 7) are provided for shifting the shiftable transmission unit 15, 16, 17, 18 and the shiftable transmission unit 19, 22, 23, 24.

Each pair of shifting means 31, 32 and 33, 34 is provided on the annular faces thereof with stepped projection means 31'', 32'' and 33'', 34'' which are shown in Figs. 9 and 10, respectively, in developed views. A projection 77 of an actuating bar 76, which is slidably mounted in the supporting means, projects between the annular faces of the shifting means which are provided with the projecting means 31' and 32', which have different lengths (Fig. 9). When the shifting means 31 and 32 move together, the projection 77 is clamped between a pair of oppositely arranged projecting means 31'' and 32''. The shifting means 31 and 32 rotate with the first shaft means 35 so that the projection 77 is engaged by any of eight pairs of projections 31'', 32'', according to the eight operative positions of the shaft 41 corresponding to the eight stepped gears of the Norton transmission when the shifting means 31, 32 are pushed towards each other. Consequently the projection 77 and the bar 76 are shifted in axial direction of the first shaft means 35 in accordance with the angular position of the first shifting means 31, 32, as can be best seen from Fig. 13, which clearly shows that the bar 76 is moved to different positions depending in which space between a pair of projection means 31'', 32'' the projection 77 has been placed by the preselecting rotation of the shifting means 31, 32. The shape of the second shifting means 33, 34 is similar to the first shifting means 31, 32 as can be best seen from Fig. 10.

Second manually operated means effect the movement of the shifting means, and the shifting of the transmission after the pre-selection has been carried out by rotating the knob 29 of the first manually operated means, and by turning the shifting means 31, 32 together with the first shaft 35 by means of the bevel gears 37 and 42 (Fig. 7).

As can be best seen from Figs. 6, 8 and 13, the handle 28, when rotated, turns the bevel gear 62 which meshes with a bevel gear 63 which is fixedly secured to a shaft 64. A gear 70 is fixedly secured to the other end of the shaft 64. The gear 70 meshes with a toothed segment 72' of the pivoted knee lever 72. A second pivoted knee lever 71 is provided with a toothed segment 71' meshing with the toothed segment 72'. The forked lever arms 31' and 32' are provided with sliding keys 73 projecting into the annular grooves 31' and 32' so that the shifting means 31, 32 are moved towards each other when the handle 28 is turned in one direction and are separated when the handle 28 is returned to its original position. According to the angular position of the first shaft means 35, which has been pre-selected by the knob 29, a pair of projecting means 31'', 32'' engage the projection 77 and shift the actuating bar 76 in accordance with the axial extension and position thereof.

Figs. 5 and 8 show that the actuating bar 76 is provided with a rack portion 76'. An operating shaft 87 is freely rotatably mounted in the supporting means and fixed thereon are two gears 86 and 80 and a worm gear 78. The gear member 86 meshes with the rack portion 76' of the actuating bar 76 so that longitudinal shifting of the actuating bar 76, effected by the shifting means 31, 32 acting on the projection 77, causes rotation of gear member 86 and of the operating shaft 87. When operating shaft 87 is rotated, the gear 80, meshing with the actuating rack bar 81, moves the fork member 82 parallel to the stepped gears 1 to 8 to slide on the rod 88. The forked portion 82' of the fork member 82 engages the annular groove 9' of the connecting gear 9, which is best seen from Figs. 5 and 3 (Fig. 12).

Simultaneously with the sliding of the fork member 82 the Norton arm 74 is pivoted to a position engaging one of the stepped gears 1 to 8 by the worm gear 78 meshing with a toothed segment 79.

The operating arrangement for the Norton transmission operates in the following manner: When the first manually operated means are rotated by turning the knob 29 the first shaft means 35 rotate the first shifting means 31, 32 to a position corresponding to the ratio of the Norton transmission indicated on the dial 26. In this position the selected pair of projecting means 31'', 32'' are located on both sides of the projection 77. When the handle 28 is turned the knee levers 71, 72 push the first shifting means 31, 32 towards each other so that the corresponding projection means shift the projection 77 and thereby the actuating bar 76. Shifting of actuating bar 76 effects movement of the operating means 87 and thereby movement of the first actuating member 81 and the second actuating member 79 which in turn shift the connecting gear 9 and pivot the Norton arm 74 to a position in which the pre-selected stepped gear meshes with the connecting gear 9.

The diameter of the gears 80 and 86 and the pitch of the worm gear 78 correspond in such manner to the distance for which the actuating bar 76 is shifted that when the arm 74 is pivoted from engagement with one of the stepped gears 1 to 8 to engagement with another stepped gear, the connecting gear 9 is shifted in axial direction for exactly the width of one gear and the width of the space between two adjacent stepped gears. The preselection of the position of the shiftable transmission units is effected through gear 52, which is intermittently rotated by the Maltese cross 43 and gear 44 as above described, and drives gear means 53, 54. Gear 54 is fixedly secured to a shaft 60 provided with a worm gear 55 meshing with a gear 56. Gear 56 meshes with gear 57 which is fixedly secured to the second shaft means 36 on which the second shifting means 33, 34 are axially slidably but non-rotatably mounted.

As explained above, the second shifting means 33, 34 are provided with second projecting means 33'', 34'', as shown in Fig. 10, so that by the intermittent rotation by gear 44 at the end of each revolution of knob 29, shaft 36 and the second shifting means 33, 34 are rotated so as to preselect one of the positions of the projecting means 33'', 34''. The second projection 94 is fixed to the slide member 95 and slides on a rod 69, as can be best seen from Fig. 4, being movable between four positions.

The shifting of the second shifting means 33, 34 by which the additional shiftable transmission units are shifted, is carried out simultaneously with the shifting of the first shifting means 31, 31 and in similar manner. When the handle 28 is operated and turns the shaft 64, not only the gear 70, but also the gear 63' rotates with the shaft 64 (Fig. 6). The gear 63' meshes with the rack bars 65 and 66 which are provided with forks 67, 68 sliding on shafts 59 and 69 (Figs. 4 and 8). The forks 67, 68 engage the annular grooves 33' and 34' of the second shifting members 33 and 34. When the second shifting members 33, 34 are pushed toward each other, the projection 94 is moved on rod 69 to one of four positions corresponding to the angular position of the members 33, 34 and to the extension of the projecting means 32'', 34'' engaging it, as indicated by II in Fig. 10.

The movement of the sliding member 95 is transferred by lever 96 to the shiftable transmission units 15, 16, 17, 18 as shown in Figs. 4 and 11.

As can be best seen from Fig. 7, a further projection 99' is provided on the actuating fork means 99 which are fixedly secured to a slidable shaft 100. The projection 99' cooperates with projecting means on the second shifting members 33, 34 as illustrated at I in Fig. 10. Consequently, when the second shifting means 33, 34 are pushed towards each other in the above-described manner by operating the handle 28, the sliding rod 100 (Fig. 6) and the fork means 99 and 101 are shifted. The fork means 101 engage the shiftable transmission units comprising the gears 19, 22, 23, 24, as can be best seen from Fig. 7. The intermittent rotation effected by the Maltese cross means for the pre-selection of the desired ratio of the shiftable transmission units is indicated by the intermittently rotating dial which shows the transmission ratio of the combined Norton transmission and the two additional shiftable transmissions. When the second manually operated means are actuated by turning the handle 28 the second shifting means engage the projections 94 and 99' which are part of actuating means for the shiftable transmissions and shift the shiftable transmission units 19, 22, 23, 24, and 15, 16, 17, 18 simultaneously with the shifting of the connecting gear 9 of the Norton transmission effected by the first shifting means 31, 32.

Since the second shifting means 33 and 34 have to effect independent actuation of the two shiftable transmissions, the operating faces thereof are provided with twenty-four pairs of oppositely arranged projection means, as can be best seen from Fig. 10, so that one of the transmissions may be four times shifted while the same type of thread is being cut. In other words the projection 99' of the fork means 101 is not shifted when the second shifting means 33, 34 are pushed toward each other, although the shifting means 33, 34 are rotated to four angularly spaced positions for the shifting of the projection 94. In Fig. 10 the white squares I, representing the projection 99', and located between pairs of projection means of the shifting means 33, 34 define the position of the fork means 101 and thereby the position of the shiftable transmission unit 22, 23, 24. The hatched squares II represent the positions of the projection 94, and define the shifting of the shiftable transmission units 15, 16, 17, 18. A rotation of the shifting means 33, 34 for one twelfth of a revolution effects a turning for two projection means, and Fig. 10 clearly illustrates that the white squares, representing projection 99', remain in the same position while the shifting means 33, 34 are four times rotated for one twelfth of a revolution, while the squares II, representing projection 94, are aligned with pairs of projecting means which cause shifting thereof when the shifting means are pushed toward each other. The movement of the projection 94 is transferred by means of the member 95 and the lever 96 to the shiftable transmission units 15 to 18 and produces variations of the transmission ratio for each position of the Norton transmission.

Referring again to Fig. 5, a disc 89 is fixedly secured to the operating shaft 87 and provided with a number of recesses 89' which are arranged in a circle. A pin 90 is screwed into the supporting means so that in the position illustrated in Fig. 5, the operating shaft 87 is locked in an operative position corresponding to a position of the Norton transmission in which the connecting gear 9 meshes with one of the stepped gears 1 to 8. The operating shaft 87 is longitudinally movably mounted in the supporting means. A member 93, formed with an annular recess, is fixedly secured to the end of the operating shaft 87 and is engaged by fork means 92. A threaded portion of the shaft 92, which is fixedly secured to the knob 30, moves the fork 92 and thereby the operating shaft 87 longitudinally. When the operating shaft 97 is moved to the right in Fig. 5, the disc 89 moves away from the arresting pin 90 and the actuating bar 76 can rotate the operating shaft 87 for pre-selection of a position. When, however, the operating shaft 87 is moved to the left and the arresting pin 90 engages one of the recesses 89', the Norton transmission is locked in one of its eight operative positions.

By turning the arresting screw 90 it is possible to adjust in axial direction the exact position of the operating shaft 87 so that the teeth of the connecting gear 9 project into the recesses between the teeth of the stepped gears to an adjustable extent.

It will be understood that each of the elements described above, or two or more together, may also find a useful application in other types of transmission arrangements differing from the types described above.

While the invention has been illustrated and described as embodied in an operating arrangement for a Norton transmission provided with first manually operated means for pre-selecting a transmission ratio and second manually operated means for shifting the transmission, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a transmission including a set of coaxial stepped gears, a pivoted arm, and connecting gear means rotatably and longitudinally slidably mounted on said arm and adapted to engage one of said stepped gears when said arm is pivoted, an operating arrangement, comprising, in combination, a housing including supporting means; a first actuating member mounted in said supporting means slidably parallel to the axis of said stepped gears and engaging the connecting gear means for sliding the same; a second actuating member turnably mounted on said supporting means and engaging the pivoted arm for pivoting the same; operating means rotatably mounted on said supporting means movable to a number of angularly spaced operative positions equal to the number of the stepped gears, and engaging said first actuating member and said second actuating member and during rotation thereof sliding said first actuating member and turning said second actuating member between a number of operative positions for effecting engagement of the connecting gear means with one of said stepped gears; actuating means mounted on said supporting means movable to a number of operative positions equal to the number of the stepped gears, said actuating means turning said operating means into said operative positions of the same; shaft means rotatably mounted in said supporting means; shifting means mounted on said shaft means non-rotatably and longitudinally slidable between an inoperative position and an operative position; first manually operated means rotating said shaft means and thereby said shifting means to a number of angular positions equal to the number of the stepped gears while said shifting means are in said inoperative position; a plurality of stepped projection means on said shifting means, the number of said projection means corresponding to the number of the stepped gears, one of said projection means being located oppositely said actuating means in each of said angular positions of said shaft means and said shifting means; and second manually operated means longitudinally sliding said shifting means on said shaft means and effecting engagement of one of said projection means with said actuating means in operative position of said shifting means and movement of said actuating means to one of said operative positions thereof for a distance corresponding to the extension of the projection means engaging said actuating means.

2. In a transmission including a set of coaxial stepped gears, a pivoted arm, and connecting gear means rotatably and longitudinally slidably mounted on said arm and adapted to engage one of said stepped gears when said arm is pivoted, an operating arrangement, comprising, in combination, a housing including supporting means; a first actuating member mounted in said supporting means slidably parallel to the axis of said stepped gears and engaging the connecting gear means for sliding the same; a second actuating member turnably mounted on said supporting means and engaging the pivoted arm for pivoting the same; operating means rotatably mounted on said supporting means movable to a number of angularly spaced operative positions equal to the number of the stepped gears, and engaging said first actuating member and said second actuating member and during rotation thereof sliding said first actuating member and turning said second actuating member between a number of operative positions for effecting engagement of the connecting gear means with one of said stepped gears; actuating means mounted on said supporting means movable to a number of operative positions equal to the number of the stepped gears, said actuating means turning said operating means into said operative positions of the same; shaft means rotatably mounted in said supporting means; shifting means mounted on said shaft means non-rotatably and longitudinally slidable between an inoperative position and an operative position; first manually operated means rotating said shaft means and thereby said shifting means to a number of angular positions equal to the number of the stepped gears while said shifting means are in said inoperative position; a plurality of stepped projection means on said shifting means, the number of said projection means corresponding to the number of the stepped gears, one of said projection means being located oppositely said actuating means in each of said angular positions of said shaft means and said shifting means; second manually operated means longitudinally sliding said shifting means on said shaft means and effecting engagement of one of said projection means with said actuating means in operative position of said shifting means and movement of said actuating means to one of said operative positions thereof for a distance corresponding to the extension of the projection means engaging said actuating means; and indicating means driven by said first manually operated means and indicating the angular position of said shifting means and thereby the position of the connecting gear relatively to said set of said gears in axial direction of the same, and the ratio of transmission obtained when said second manually operated means and said shifting means move the connecting gear into engagement with the stepped gear.

3. A transmission arrangement, comprising, in combination, a housing including supporting means; a driven shaft rotatably mounted on said supporting means; at least one transmission shiftable to a plurality of positions mounted on said supporting means and driving said driven shaft at a plurality of speeds; a drive shaft rotatably mounted on said supporting means; a Norton transmission mounted on said supporting means and operatively connecting said drive shaft and said shiftable transmission, said Norton transmission including a set of coaxial stepped gears, a pivoted arm, and connecting gear means rotatably and longitudinally slidably mounted on said arm and adapted to engage any one of said stepped gears when said arm is pivoted; a first actuating member mounted in said supporting means slidably parallel to the axis of said stepped gears and engaging said connecting gear means for sliding the same; a second actuating member turnably mounted on said supporting means and engaging said pivoted arm for pivoting the same; operating means rotatably mounted on said supporting means turnable to a number of operative positions equal to the number of the stepped gears, and engaging said first actuating member and said second actuating member, and during rotation thereof sliding said first actuating member parallel to the axis of said stepped gears, and turning said second actuating member between a number of operative positions for effecting engagement of the connecting gear means with one of said stepped gears; first actuating means mounted on said supporting means movable to a number of operative positions equal to the number of the stepped gears, said first actuating means turning said operating means into said operative positions of the same; first shaft means rotatably mounted on said supporting means; first shifting means mounted on said first shaft means non-rotatably and longitudinally slidably between an inoperative position and an operative position; second shaft means rotatably mounted on said supporting means movable to a number of operative positions equal to the number of shifted positions of said transmission; Maltese cross means; a gear rotatably mounted on said supporting means, said Maltese gear means effecting intermittent rotation of said gear and of said second shaft means for a predetermined fraction of a revolution for each revolution of said first shaft means; second actuating means mounted on said supporting means movable to a number of operative positions equal to the number of shifted positions of said transmission; second shifting means mounted on said second shaft means non-rotatable and longitudinally slidable between an inoperative position and an operative position; first manually operated means rotatably mounted on said supporting means for rotating said first shaft means and thereby said first shifting means to a number of angular positions equal to the number of stepped gears while said first shifting means are in said inoperative position; a plurality of first stepped projection means on said first shifting means, the number of said first projection means corresponding to the number of the stepped gears, one of said first projection means being located oppositely said first actuating means in each of said angular positions of said first shaft means and of said first shifting means; a plurality of second stepped projection means on said second shifting means, the number of said second projection means corresponding to the number of positions of said shiftable transmission, one of said second projection means being located oppositely said second actuating means in each of said angular positions of said second shaft means and of said second shifting means; second manually operated means longitudinally sliding said first shifting means on said first shaft means, and said second shifting means on said second shaft means and effecting engagement of one of said first projection means with said first actuating means, and engagement of one of said second projection means with said second actuating means in operative position of said first and second shifting means, and movement of said first and second actuating means in one of said operative positions thereof for a distance corresponding to the extension of the respective projection means engaging the same; an indicating dial fixedly secured to said intermittently rotating gear so that said dial rotates for a predetermined angle whenever said transmission is shifted; a pointer turnably mounted over said dial; and motion transmitting means mounted in said supporting means connecting said first manually operated means with said pointer and turning said pointer about said predetermined angle during each revolution of said first manually operated means, said motion transmission means including a rotatable cam and a spring loaded cam follower, said cam being shaped in such manner that said pointer returns to the original position thereof at the end of each revolution of said first shaft means.

4. In a transmission including a set of coaxial stepped gears, a pivoted arm, and connecting gear means rotatably and longitudinally slidably mounted on said arm and adapted to engage one of said stepped gears when said arm is pivoted, an operating arrangement, comprising, in combination, a housing including supporting means; a first actuating member mounted in said supporting means slidably parallel to the axis of said stepped gears and engaging the connecting gear means for sliding the same; a second actuating member turnably mounted on said supporting means and engaging the pivoted arm for pivoting the same; operating means rotatably mounted on said supporting means movable to a number of angularly spaced operative positions equal to the number of the stepped gears, and engaging said first actuating member and said second actuating member and during rotation thereof sliding said first actuating member and turning said second actuating member between a number of operative positions for effecting engagement of the connecting gear means with one of said stepped gears; actuating means mounted on said supporting means movable to a number of operative positions equal to the number of the stepped gears, said actuating means turning said operating means into said operative positions of the same; shaft means rotatably mounted in said supporting means; shifting means mounted on said shaft means non-rotatably and longitudinally slidable between an inoperative position and an operative position; first manually operated means rotating said shaft means and thereby said shifting means to a number of angular positions equal to the number of the stepped gears while said shifting means are in said inoperative position; a plurality of stepped projection means on said shifting means, the number of said projection means corresponding to the number of the stepped gears, one of said projection means being located oppositely said actuating means in each of said angular positions of said shaft means and said shifting means; second manually operated means longitudinally sliding said shifting means on said shaft means and effecting engagement of one of said projection means with said actuating means in operative position of said shifting means and movement of said actuating means to one of said operative positions thereof for a distance corresponding to the extension of the projection means engaging said actuating means; manually operated locking means mounted on said supporting means movable between an inoperative position and an operative position, and engaging in said operative position thereof said operating means and holding the same immovable in one of said operative positions of the same while said connecting gear means engage one of said stepped gears; and indicating means driven by said first manually operated means and indicating the angular position of said shifting means and thereby the position of the connecting gear relatively to said set of said gears in axial direction of the same, and the ratio of transmission obtained when said second manually operated means and said shifting means move the connecting gear into engagement with the stepped gear.

5. A transmission arrangement, comprising, in combination, a housing including supporting means; a driven shaft rotatably mounted on said supporting means; at least one transmission shiftable to a plurality of positions mounted on said supporting means and driving said driven shaft at a plurality of speeds; a drive shaft rotatably mounted on said supporting means; a Norton transmission mounted on said supporting means and operatively connecting said drive shaft and said shiftable transmission, said Norton transmission including a set of coaxial stepped gears, a pivoted arm, and connecting gear means rotatably and longitudinally slidably mounted on said arm and adapted to engage any one of said stepped gears when said arm is pivoted; a first actuating member mounted in said supporting means slidably parallel to the axis of said stepped gears and engaging said connecting gear means for sliding the same; a second actuating member turnably mounted on said supporting means and engaging said pivoted arm for pivoting the same; operating means rotatably mounted on said supporting means turnable to a number of operative positions equal to the number of the stepped gears, and engaging said first actuating member and said second actuating member, and during rotation thereof sliding said first actuating member parallel to the axis of said stepped gears, and turning said second actuating member between a number of operative positions for effecting engagement of the connecting gear means with one of said stepped gears; first actuating means mounted on said supporting means movable to a number of operative positions equal to the number of the stepped gears, said first actuating means turning said operating means into said operative positions of the same; first shaft means rotatably mounted on said supporting means; first shifting means mounted on said first shaft means non-rotatably and longitudinally slidably between an inoperative position and an operative position; second shaft means rotatably mounted on said supporting means movable to a number of operative positions equal to the number of shifted positions of said transmission; Maltese cross means; a gear rotatably mounted on said supporting means, said Maltese gear means effecting intermittent rotation of said gear and of said second shaft means for a predetermined fraction of a revolution for each revolution of said first shaft means; second actuating means mounted on said supporting means movable to a number of operative positions equal to the number of shifted positions of said transmission; second shifting means mounted on said second shaft means non-rotatable and longitudinally slidable between an inoperative position and an operative position; first manually operated means rotatably mounted on said supporting means for rotating said first shaft means and thereby said first shifting means to a number of angular positions equal to the number of stepped gears while said first shifting means are in said inoperative position; a plurality of first stepped projection means on said first shifting means, the number of said first projection means corresponding to the number of the stepped gears, one of said first projection means being located oppositely said first actuating means in each of said angular positions of said first shaft means and of said first shifting means; a plurality of second stepped projection means on said second shifting means, the number of said second projection means corresponding to the number of positions of said shiftable transmission, one of said second projection means being located oppositely said second actuating means in each of said angular positions of said second shaft means and of said second shifting means; second manually operated means longitudinally sliding said first shifting means on said first shaft means, and said second shifting means on said second shaft means and effecting engagement of one of said first projection means with said first actuating means, and engagement of one of said second projection means with said second actuating means in operative position of said first and second shifting means, and movement of said first and second actuating means in one of said operative positions thereof for a distance corresponding to the extension of the respective projection means engaging the same; manually operated locking means mounted on said supporting means movable between an inoperative position and an operative position, and engaging in said operative position thereof said operating means and holding the same immovable in one of said operative positions of the same while said connecting gear means engage one of said stepped gears; an indicating dial fixedly secured to said intermittently rotating gear so that said dial rotates for a predetermined angle whenever said transmission is shifted; a pointer turnably mounted over said dial; and motion transmitting means mounted in said supporting means connecting said first manually operated means with said pointer and turning said pointer about said predetermined angle during each revolution of said first manually operated means, said motion transmission means including a rotatable cam and a spring loaded cam follower, said cam being shaped in such manner that said pointer returns to the original position thereof at the end of each revolution of said first shaft means.

6. In a transmission including a set of coaxial stepped gears, a pivoted arm, and connecting gear means rotatably and longitudinally slidably mounted on said arm and adapted to engage one of said stepped gears when said arm is pivoted, an operating arrangement, comprising, in combination, a housing including supporting means; a first actuating member mounted in said supporting means slidably parallel to the axis of said stepped gears and engaging the connecting gear means for sliding the same; a second actuating member turnably mounted on said supporting means and engaging the pivoted arm for pivoting the same; operating shaft rotatably mounted on said supporting means movable to a number of angularly spaced operative positions equal to the number of the stepped gears, and engaging said first actuating member and said second actuating member and during rotation thereof sliding said first actuating member and turning said second actuating member between a number of operative positions for effecting engagement of the connecting gear means with one of said stepped gears; a gear member fixedly secured to said operating shaft; an actuating bar longitudinally slidably mounted on said supporting means movable to a number of operative positions equal to the number of the stepped gears, said actuating bar being formed with a rack portion meshing with said gear member and turning said operating shaft into said angularly spaced operative positions of the same; a projection on said actuating bar; shifting means mounted on said shaft means non-rotatably and longitudinally slidable between an inoperative position and an operative position; first manually operated means rotating said shaft means and thereby said shifting means to a number of angular positions equal to the number of the stepped gears while said shifting means are in said inoperative position; a plurality of stepped projection means on said shifting means, the number of said projection means corresponding to the number of the stepped gears, one of said projection means being located oppositely said projection in each of said angular positions of said shaft means and said shifting means; second manually operated means longitudinally sliding said shifting means on said shaft means and effecting engagement of one of said projection means with said projection in operative position of said shifting means and movement of said actuating bar to one of said operative positions thereof for a distance corresponding to the extension of the projection means engaging said projection; and indicating means driven by said first manually operated means and indicating the angular position of said shifting means and thereby the position of the connecting gear relatively to said set of said gears in axial direction of the same, and the ratio of transmission obtained when said second manually operated means and said shifting means move the connecting gear into engagement with the stepped gear.

7. In a transmission including a set of coaxial stepped gears, a pivoted arm, and connecting gear means rotatably and longitudinally slidably mounted on said arm and adapted to engage one of said stepped gears when said arm is pivoted, an operating arrangement, comprising, in combination, a housing including supporting means; an actuating rack bar mounted in said supporting means slidably parallel to the axis of said stepped gears and engaging the connecting gear means for sliding the same; an actuating toothed segment turnably mounted on said supporting means and engaging the pivoted arm for pivoting the same; an operating shaft rotatably mounted on said supporting means movable to a number of angularly spaced operative positions equal to the number of the stepped gears; a toothed wheel fixed on said operating shaft and engaging said actuating rack bar; a worm wheel fixed on said operating shaft and meshing with said actuating toothed segment, so that during rotation of said operating shaft said actuating rack bar slides longitudinally, and said actuating toothed segment is turned between a number of operative positions for effecting engagement of the connecting gear means with one of said stepped gears; a gear member fixedly secured to said operating shaft; an actuating bar longitudinally slidably mounted on said supporting means movable to a number of operative positions equal to the number of the stepped gears, said actuating bar being formed with a rack portion meshing with said gear member and turning said operating shaft into said angularly spaced operative positions of the same; a projection on said actuating bar; shifting means mounted on said shaft means non-rotatably and longitudinally slidable between an inoperative position and an operative position; first manually operated means rotating said shaft means and thereby said shifting means to a number of angular positions equal to the number of the stepped gears while said shifting means are in said inoperative position; a plurality of stepped projection means on said shifting means, the number of said projection means corresponding to the number of the stepped gears, one of said projection means being located oppositely said projection in each of said angular positions of said shaft means and said shifting means; second manually operated means longitudinally sliding said shifting means on said shaft means and effecting engagement of one of said projection means with said projection in operative position of said shifting means and movement of said actuating bar to one of said operative positions thereof for a distance corresponding to the extension of the projection means engaging said projection; and indicating means driven by said first manually operated means and indicating the angular position of said shifting means and thereby the position of the connecting gear relatively to said set of said gears in axial direction of the same, and the ratio of transmission obtained when said second manually operated means and said shifting means move the connecting gear into engagement with the stepped gear.

8. An operating arrangement according to claim 7 wherein said operating shaft is mounted on said supporting means slidable for a short distance in axial direction thereof between two axially spaced positions, and including a disc fixedly secured to said operating shaft and formed with a number of recesses equal to the number of said stepped gears and corresponding to operative angular positions of said operating shaft, said recesses being arranged in a circle; a pin mounted in said supporting means projecting into one of said recesses when said operating shaft is in one of said axially spaced positions so as to prevent rotation thereof; third manually operated means mounted in said supporting means movable between an inoperative position and an operative position and in said operative position thereof holding said operating shaft in said one axially spaced position, and holding in inoperative position thereof said operating shaft in the other axially spaced position permitting rotation of the same.

9. A transmission arrangement, comprising, in combination, a housing including supporting means; a driven shaft rotatably mounted on said supporting means; at least one transmission shiftable to a plurality of positions mounted on said supporting means and driving said driven shaft at a plurality of speeds; a drive shaft rotatably mounted on said supporting means; a Norton transmission mounted on said supporting means and operatively connecting said drive shaft and said shiftable transmission, said transmission including a set of coaxial stepped gears, a pivoted arm, and connecting gear means rotatably and longitudinally slidably mounted on said arm and adapted to engage any one of said stepped gears when said arm is pivoted; an actuating rack bar mounted in said supporting means slidable parallel to the axis of said stepped gears and engaging said connecting gear means for sliding the same; an actuating toothed segment turnably mounted on said supporting means and engaging said pivoted arm for pivoting the same; an operating shaft rotatably mounted on said supporting means turnable to a number of angularly spaced operative positions equal to the number of said stepped gears; a gear member fixedly secured to said operating shaft; an actuating bar longitudinally slidably mounted on said supporting means for movement to a number of operative positions equal to the number of said stepped gears, said actuating bar being formed with a rack portion meshing with said gear member and turning said operating shaft into said angularly spaced operative positions of the same; a first projection on said actuating bar; first shaft means rotatably mounted on said supporting means; first shifting means mounted on said first shaft means non-rotatably and longitudinally slidably between an inoperative position and an operative position; second shaft means rotatably mounted on said supporting means movable to a number of operative positions equal to the number of shifted positions of said transmission; Maltese cross means; a gear rotatably mounted on said supporting means, said Maltese gear means effecting intermittent rotation of said gear and of said second shaft means for a predetermined fraction of a revolution for each revolution of said first shaft means; a second actuating bar longitudinally slidably mounted on said supporting means movable to a number of operative positions equal to the number of positions of said transmission; a second projection on said second actuating bar; second shifting means mounted on said second shaft means non-rotatable and longitudinally slidable between an inoperative position and an operative position; first manually operated means rotatably mounted on said supporting means for rotating said first shaft means and thereby said first shifting means to a number of angular positions equal to the number of stepped gears while said first shifting means are in said inoperative position; a plurality of first stepped projection means on said first shifting means, the number of said first projection means corresponding to the number of the stepped gears, one of said first projection means being located oppositely said first projection in each of said angular positions of said first shaft means and of said first shifting means; a plurality of second stepped projection means on said second shifting means, the number of said second projection means corresponding to the number of positions of said shiftable transmission, one of said second projection means being located oppositely said second projection in each of said angular positions of said second shaft means and of said second shifting means; second manually operated means longitudinally sliding said first shifting means on said first shaft means, and said second shifting means on said second shaft means and effecting engagement of one of said first projection means with said first projection, and engagement of one of said second projection means with said second projection in operative position of said first and second shifting means, and movement of said first and second actuating bars in one of said operative positions thereof for a distance corresponding to the extension of the respective projection means engaging the same; an indicating dial fixedly secured to said intermittently rotating gear so that said dial rotates for a predetermined angle whenever said transmission is shifted; a pointer turnably mounted over said dial; and motion transmitting means mounted in said supporting means connecting said first manually operated means with said pointer and turning said pointer about said predetermined angle during each revolution of said first manually operated means, said motion transmission means including a rotatable cam and a spring loaded cam follower, said cam being shaped in such manner that said pointer returns to the original position thereof at the end of each revolution of said first shaft means.

10. A transmission arrangement according to claim 9 wherein said operating shaft is mounted on said supporting means slidable for a short distance in axial direction thereof between two axially spaced positions, and including a disc fixedly secured to said operating shaft and formed with a number of recesses equal to the number of said stepped gears and corresponding to operative angular positions of said operating shaft, said recesses being arranged in a circle; a pin mounted in said supporting means projecting into one of said recesses when said operating shaft is in one of said axially spaced positions so as to prevent rotation thereof; third manually operated means mounted in said supporting means movable between an inoperative position and an operative position and engaging in said operative position thereof holding said operating shaft in said one axially spaced position, and holding in inoperative position thereof said operating shaft in the other axially spaced position permitting rotation of the same.

11. A transmission arrangement according to claim 9 wherein said operating shaft is mounted on said supporting means slidable for a short distance in axial direction thereof between two axially spaced positions, and including a disc fixedly secured to said operating shaft and formed with a number of recesses equal to the number of said stepped gears and corresponding to operative angular positions of said operating shaft, said recesses being arranged in a circle; a pin mounted in said supporting means projecting into one of said recesses when said operating shaft is in one of said axially spaced positions so as to prevent rotation thereof; third manually operated means mounted in said supporting means movable between an inoperative position and an operative position and in said operative position thereof holding said operating shaft in said one axially spaced position, and holding in inoperative position thereof said operating shaft in the other axially spaced position permitting rotation of the same.

12. A transmission according to claim 3 wherein said stepped gears and said connecting gear means constitute a transmission in arithmetic progression and wherein said shiftable transmission transmits speeds in a varied progression; and including a further shiftable transmission for cutting inch threads, millimeter threads and module threads; and actuating means connected to said further shiftable transmission for shifting the same, said third actuating means being actuated by said second shifting means in accordance with the angular position of the same.

13. An arrangement as claimed in claim 3 wherein said first manually operated means include a cam shaft rotatably mounted in said supporting means, and a knob; and wherein said cam of said motion transmitting means is fixed on said cam shaft and wherein said cam follower is longitudinally slidable on said supporting means and formed with a rack portion; and including gear means connecting said cam shaft and said first shaft means; spring means abutting against said cam follower and urging the same toward said cam, the shape of said cam being such that said cam follower is moved during the greater part of each revolution of said first shaft means in one direction against the action of said spring means, and is moved by said spring means toward the end of each revolution in the opposite direction; gear means positively interconnecting said pointer and said rack portion of said cam follower so that said pointer moves for a predetermined angle during each revolution of said first shaft means and returns to its original position at the end of each revolution; a Maltese pin and disc means fixedly secured to said cam shaft; a Maltese cross means rotatably mounted on said supporting means and meshing with said Maltese pin and disc means so as to be intermittently rotated, said Maltese cross means moving once during each revolution of said first shaft means and simultaneously with the return movement of said cam follower and of said pointer; a first intermittently rotating gear fixedly secured to said Maltese cross means; and a second intermittently rotating gear meshing with said first intermittently rotating gear and being fixedly secured to said dial.

14. An arrangement as claimed in claim 9 wherein said first manually operated means include a cam shaft rotatably mounted in said supporting means, and a knob; and wherein said cam of said motion transmitting means is fixed on said cam shaft and wherein said cam follower is longitudinally slidable on said supporting means and formed with a rack portion; and including gear means connecting said cam shaft and said first shaft means; spring means abutting against said cam follower and urging the same toward said cam, the shape of said cam being such that said cam follower is moved during the greater part of each revolution of said first shaft means in one direction against the action of said spring means, and is moved by said spring means toward the end of each revolution in the opposite direction; gear means positively interconnecting said pointer and said rack portion of said cam follower so that said pointer moves for a predetermined angle during each revolution of said first shaft means and returns to its original position at the end of each revolution; a Maltese pin and disc means fixedly secured to said cam shaft; a Maltese cross means rotatably mounted on said supporting means and meshing with said Maltese pin and disc means so as to be intermittently rotated, said Maltese cross means moving once during each revolution of said first shaft means and simultaneously with the return movement of said cam follower and of said pointer; a first intermittently rotating gear fixedly secured to said Maltese cross means; and a second intermittently rotating gear meshing with said first intermittently rotating gear and being fixedly secured to said dial.

15. An arrangement as claimed in claim 9 and comprising further transmission means including a shiftable transmission unit; a rod secured to said supporting means; a fork means slidably mounted on said rod and provided with a third projection, said third projection projecting into the path of said second projection means so that said fork means are shifted by said second shifting means for a distance determined by the angular position of said second shifting means, said fork means engaging said shiftable transmission unit for shifting said further transmission.

References Cited in the file of this patent

UNITED STATES PATENTS

| | | |
|---|---|---|
| 840,669 | Thiel | Jan. 8, 1907 |
| 877,213 | Mill | Jan. 21, 1908 |
| 892,662 | Gridley | July 7, 1908 |
| 918,773 | Schatz | Apr. 20, 1909 |
| 938,479 | Grohmann | Nov. 2, 1909 |
| 2,662,417 | Mascherpa | Dec. 15, 1953 |